Dec. 20, 1927.
R. D. PIKE
1,653,507
REGENERATIVE FURNACE FOR MELTING GLASS
Filed March 21, 1923
2 Sheets-Sheet 1
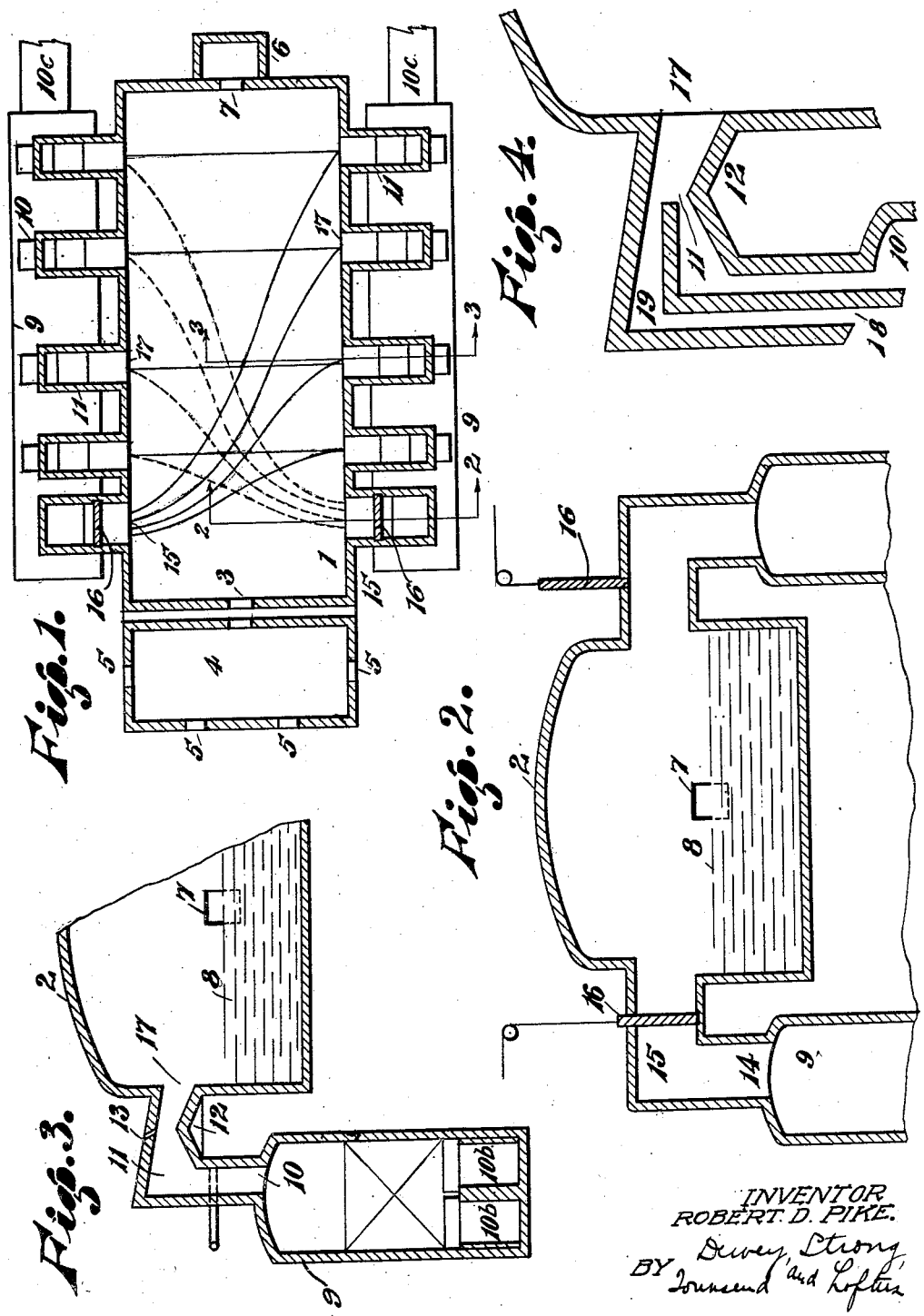
INVENTOR
ROBERT D. PIKE.
BY
ATTORNEYS Dec. 20, 1927. 1,653,507
R. D. PIKE
REGENERATIVE FURNACE FOR MELTING GLASS
Filed March 21, 1923 2 Sheets-Sheet 2
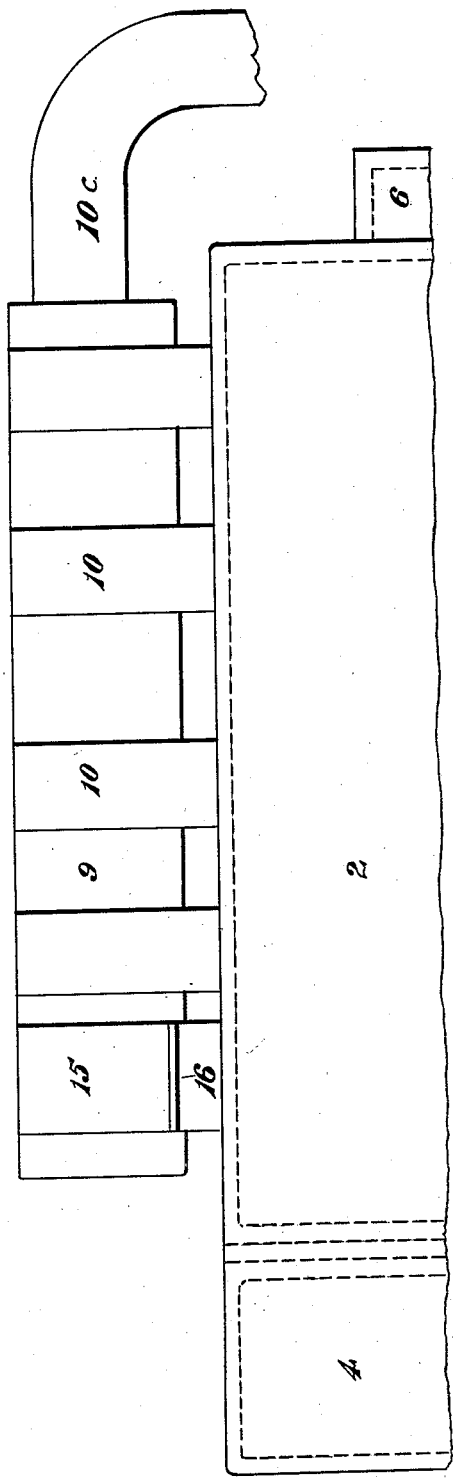
INVENTOR
ROBERT D. PIKE.
BY Dewey, Strong,
Townsend and Loftus.
ATTORNEYS.

Patented Dec. 20, 1927.

1,653,507

UNITED STATES PATENT OFFICE.

ROBERT D. PIKE, OF SAN FRANCISCO, CALIFORNIA, ASSIGNOR TO COLE-FRENCH COMPANY, A CORPORATION.

REGENERATIVE FURNACE FOR MELTING GLASS.

Application filed March 21, 1923. Serial No. 626,517.

This invention relates to an improved method for constructing regenerative tank furnaces for melting glass and has for its object the bettering of thermal efficiency and the better preservation of certain parts of the lining of the furnace hearth which in practice suffer by too close contact with the hottest portion of the flame.

In present day construction of glass tank furnaces the melting portion consists of a rectangular tank whose walls are built of fire clay blocks, and the longer dimension of such tanks is usually about double the shorter dimension. On either longer side are a number of ports, usually four or five, which alternately serve to conduct gases of combustion away from or to supply flame to the furnace. Thus a number of flames are always passing over the surface of the glass through the shorter dimension of the furnace, and in successively opposite directions.

The glass batch for melting is introduced into one or more bays situated in one of the shorter sides of the tank, and passing progressively through the tank in the direction of the longer dimension, becomes successively melted and fined. In practice, it is found that the corrosion on the fire brick lining of the feeding bays is excessive and to partly overcome this it is customary to make the ports nearest to the side of the tank, where are situated the feeding bays, smaller than the other ports so that the amount of fuel burned in immediate proximity to the bays is reduced and their brick work is in a measure preserved because of the resulting relatively lower temperature in their neighborhood. But this construction lessens the capacity of the tank by reducing the amount of fuel which can be burned and slowing up the initial decomposition and melting of the batch.

Such furnaces are also inefficient in use of fuel because the flame plays across the short dimension of the furnace, and is of relatively low calorific intensity, and the path of travel of the flame being relatively short, the gases of combustion composing it and resulting from it do not have a chance to give all their available heat up to the glass, which can only be accomplished by making the path of travel of a sufficient length, which is usually double that afforded by the glass tank furnaces at present employed. At the same time, the present shape of glass tank furnaces which constrain the molten glass to pass parallel to the long dimension, and the flames to travel transverse to the same direction is necessary in order to create a uniform and properly timed flow of glass to effect the necessary fining, or removal of gaseous materials therefrom; and to maintain the glass at the optimum fining temperature during its entire length of travel through the furnace.

It is well known that regenerative open hearth steel furnaces are so constructed that on the incoming end of the furnace all of the air is constrained to pass through a single narrow port in close proximity to the fuel, thus giving a flame of high calorific intensity, while on the outgoing end the passage for the gases to the regenerator chambers is enlarged by opening auxiliary valves, thus allowing free passage of the gases of combustion to the stack. In the furnace of my invention there are a number of high velocity flames of high calorific intensity along the longer side of a glass tank furnace, and the products of combustion pursue a substantially diagonal course over the furnace hearth, a portion of them leaving the furnace through all or some of the fuel and air ports on the outgoing side, and the balance through a reversing valve situated on the longer side of the furnace on the far side of the fuel and air ports from the feed end of the furnace.

My present invention enables the maintenance of high temperatures at the feed end of the furnace without resulting in correspondingly high temperatures in the neighborhood of the feed bay, and, at the same time, by producing a very high flame temperature and by lengthening the path of travel of the gases of combustion within the furnace, leads to economy in the use of fuel.

A second advantage arising from my construction is due to increasing the mean effective length of travel of the gases of combustion through the regenerator chambers, thus giving them a better opportunity of giving up their available heat to the checker brick.

In the accompanying drawings—

Fig. 1 shows a plan view of a furnace embodying my invention.

Fig. 2 shows a sectional view taken on the line 2—2 of Fig. 1.

Fig. 3 shows a sectional view taken on the line 3—3 of Fig. 1.

Fig. 4 shows a view similar to Fig. 2 illustrating a type of furnace suitable for using producer gas.

Fig. 5 shows a plan view of a portion of a furnace embodying my invention.

I show a glass tank 1 comprised of suitable refractory material and covered by a roof 2. It is connected through a submerged port 3 or by other suitable means with a settling chamber 4 for molten glass, from whence the glass is removed for working through ports 5. The feed is through a bay 6 connected with the interior of the furnace through an opening 7, the molten glass within the furnace being maintained at the level 8. The usual regenerative chambers 9 are connected with the furnace by uptakes 10, through which air for combustion passes upwardly or gases of combustion pass downwardly in accordance with the setting of the usual reversing valves (not shown) which are an adjunct of furnaces of this type. Uptakes 10 connect with restricted passages 11, the restriction being preferably of a venturi-like nature, as indicated at 12, and said passages opening into the interior of the furnace through ports 17. Fuel is introduced through a burner 13, preferably immediately behind the throat 12 or that part of the passage having the maximum restriction.

The regenerators 9 at their ends farthest from the feed bay are each connected through an uptake 14 with a horizontal passage 15 which communicates with the interior of the furnace above the glass level 8. The transverse area of each of the passages 15 and uptakes 14 is preferably substantially equal to the sum of the restricted areas 12 on the same side of the furnace, but may be greater or less than this without departing from the spirit of my invention. The passageways 15 are provided with reversing valves 16 which are connected with any suitable reversing mechanism, not shown, whereby when gases of combustion are passing through the throats 12, damper 16 is open and when flame is being made through ports 17, damper 16 is closed. In operation the valve 16 on one side is closed when the other valve 16 is open. On the side of the closed valve the flame issues from the throats 12 and ports 17 while the products of combustion pass to the other side, entering ports 17 and 15, and thence the passages 12 and 14.

The result of the described arrangement is that when damper 16 is closed and flame is being made through the ports 17 on that side of the furnace all of the air for combustion is constrained to pass at high velocity through the throats 12, thus effecting an intimate mixture with the fuel and resulting in a hot torch-like flame which makes for the efficient use of the fuel. But when the furnace is reversed and gases of combustion pass through the throats 12, the area of the latter is not sufficiently large to pass all of these gases, but substantially one-half of them pass through the passageway 15, because of the fact that during this period of operation of the furnace the valve 16 is open.

Gases of combustion during every alternate reversal period enter the regenerator chambers 9 at top thereof through the uptakes 10 and 14, and pursuing a generally downward course, enter the bottom flue 10$^b$, pass towards the feed end of the furnace and thence through the flues 10$^c$, and on through a suitable reversing valve (not shown) to a suitable stack (not shown). On the next reversing period air is blown by suitable fan (not shown) through the mentioned reversing valve, and passing through flues 10$^c$ and 10$^b$, pursues a general upward course through the checkers and through uptakes 10, thence mingling with fuel at restricted passages 11, the uptakes 14 during this period being closed. As substantially one-half of the gases of combustion enter the regenerator through uptakes 14 at the far end from the outlet, the result is that the mean effective length of path through the checkers is much greater than if all of the gases entered through uptakes 10, which is the case in present practice; and a more complete transfer of heat is effected from gas to checker brick, which during the next reversal results in a hotter air for combustion. It will be understood, however, that this arrangement of the regenerator is not essential to the other features of my invention.

The heavy curved lines in Fig. 1 show the principal line of travel of the gases of combustion across the furnace diagonally from the ports 17 on one side to the ports and the passageway 15 on the opposite side, while the dotted lines indicate the secondary flow lines of lesser quantities of gases of combustion which pass outwardly through the ports 17 nearest the feed end of the furnace.

This deflection of the flow of gases has a very important result in that a relatively cool spot in the furnace is created at the center of the end wall at the feed end in the neighborhood of the feed bay, as indicated by the preponderance of dotted flow lines in this region; but, at the same time, the corners of the furnace at the feed end will be hot because the full flame will play over these regions. The relatively cool region in the neighborhood of the feed bay will tend to preserve not only the brick work of which the feed bay is built, but also the immediate junction of the walls of the feed bay and the walls of the furnace proper, which is subject to a heavy corrosive action by the partly melted and only partly mixed alkaline elements of the charge.

The cold region in the neighborhood of the feed bay can be enlarged and accentuated and at the same time the mean travel of the flame can be increased by providing the ports 17 and passageways on either side nearest the feed end with the regulatable means of restriction shown in my application for Letters Patent, Serial No. 593,879, filed October 11th, 1922, and so operating said means that when gases of combustion are passing through the other passageways 11 on one side the passageway 11 nearest the feed end will be entirely closed, but when flame is being made on this side the said passageway will be opened to present a restricted opening for the passage of the air for combustion of substantially the same area as the throats 12. The flow lines of Fig. 1 further show that the average length of path of travel of the gases of combustion over the molten glass is lengthened as compared with the present furnaces in which the gases pass directly across the furnace from one long side to the other, which lengthening of path of flow has an important influence in increasing the thermal efficiency of the furnace.

In Fig. 4 I show fuel and air passages adapted for use with producer gas. The heated gas is admitted through a duct 18 and passes at high velocity through a duct 19, entering the passageway 11 in front of or behind the restriction or throat 12, where the air and gas mix thoroughly together before entering the furnace through the port 17.

If desired, the uptakes 14 may be positioned adjacent the feed end of the furnace, in which case the gases of combustion will still travel diagonally and with high velocity, but will tend towards the feed end.

Having thus described my invention, what I claim and desire to secure by Letters Patent is:

1. A regenerative tank furnace for melting glass comprising a glass tank having an inlet for the glass at one of its shorter sides, a plurality of combined fuel and air ports, each of a relatively small area and positioned to distribute the flame uniformly over the glass over practically the entire length of the furnace, a supplemental passageway leading from each side of the tank at the end thereof remote from the feed inlet, each of said supplemental passageways being of an area substantially equal to the combined areas of the fuel and air passageways on one side of the furnace and means to close the supplemental passageways on the flame side of the furnace and open the one on the exhaust side whereby a portion of the products of combustion will be carried off through the supplemental passageway.

2. A regenerative tank furnace for melting glass comprising a glass tank, a plurality of fuel and air ports in each of the longer sides of the tank, a regenerative chamber having communication with said ports, means for admitting glass to the tank at one of the shorter sides thereof, a supplemental passageway connecting each regenerative chamber with the interior of the tank at a point remote from the glass intake and means for controlling said ports and passageways to cause the products of combustion to pursue a substantially diagonal course across the furnace leading away from the said glass inlet.

3. A regenerative tank furnace for melting glass comprising in combination a glass tank, a plurality of fuel and air ports along each of the longer sides of the tank, and adapted to distribute the flame uniformly over the glass in front of the ports along practically the entire length of the furnace on the firing side, one or more feed inlets for the glass batch on one of the shorter sides of the furnace, regenerative chambers having communication with the said ports and an additional channel leading from the furnace on either of the longer sides thereof adjacent to the said fuel and air ports and on the far side thereof from the said feed inlets, and means for causing the entire air for combustion passing through the regenerative chambers on the firing side of the furnace to pass through the said fuel and air ports and the products of combustion of the flame issuing therefrom to pursue a substantially diagonal course across the furnace tending away from the said feed inlets.

4. A regenerative tank furnace for melting glass, comprising a tank, combined fuel and air ports on opposite sides of the tank; a supplemental combustion gas outlet port at each opposite side and alongside the said fuel and air ports, and means operated in step with the reversing mechanism whereby the supplemental port alongside the flame-making ports is closed and the opposite supplemental port is open, the said methodical opening and shutting of the supplemental ports causing a portion of the gases of combustion to pursue a diagonal path across the furnace.

ROBERT D. PIKE.